(12) United States Patent
Mendiola et al.

(10) Patent No.: US 9,836,941 B2
(45) Date of Patent: Dec. 5, 2017

(54) HEAVY EQUIPMENT PROXIMITY ALERT SYSTEM

(71) Applicant: TAC Insight, LLC, Knoxville, TN (US)

(72) Inventors: Michael J. Mendiola, West, TX (US); Steven B Rasmussen, Knoxville, TN (US)

( * ) Notice: Subject to any disclaimer, the term of this patent is extended or adjusted under 35 U.S.C. 154(b) by 0 days.

(21) Appl. No.: 15/014,413

(22) Filed: Feb. 3, 2016

(65) Prior Publication Data

US 2016/0232771 A1 Aug. 11, 2016

Related U.S. Application Data

(60) Provisional application No. 62/113,662, filed on Feb. 9, 2015.

(51) Int. Cl.
G08B 21/00 (2006.01)
G08B 21/02 (2006.01)
G08B 21/22 (2006.01)
F16P 3/14 (2006.01)

(52) U.S. Cl.
CPC ............ G08B 21/0205 (2013.01); F16P 3/14 (2013.01); F16P 3/147 (2013.01); G08B 21/22 (2013.01)

(58) Field of Classification Search
None
See application file for complete search history.

(56) References Cited

U.S. PATENT DOCUMENTS

| | | | |
|---|---|---|---|
| 7,629,880 B2 * | 12/2009 | Stilp | G08B 1/08 340/506 |
| 7,752,020 B2 | 7/2010 | Seppanen et al. | |
| 2007/0027732 A1 | 2/2007 | Hudgens | |
| 2010/0289662 A1 * | 11/2010 | Dasilva | F16P 3/147 340/686.6 |
| 2011/0313874 A1 | 12/2011 | Hardie et al. | |
| 2012/0242503 A1 | 9/2012 | Thomas et al. | |
| 2012/0319846 A1 | 12/2012 | Rogers | |
| 2013/0127638 A1 | 5/2013 | Harrison | |
| 2013/0271274 A1 | 10/2013 | Ebert | |
| 2014/0159888 A1 * | 6/2014 | Gauger | F16P 3/14 340/438 |
| 2014/0247127 A1 * | 9/2014 | Prieto | G06Q 10/10 340/540 |
| 2014/0266720 A1 * | 9/2014 | McGowan | A63B 69/0048 340/541 |
| 2014/0297343 A1 * | 10/2014 | Tucker | A01B 69/008 705/7.12 |

(Continued)

*Primary Examiner* — Julie Lieu
(74) *Attorney, Agent, or Firm* — Matthew M. Googe; Robinson IP Law, PLLC (57) ABSTRACT

A proximity alert system for tracking one or more persons in proximity of heavy equipment is provided. The proximity alert system includes a database configured to store identifying data and an identification code of an asset in a worksite, one or more beacons configured to transmit a low energy transmission including an identification code, and one or more receiving units attached to one or more pieces within a worksite configured to detect and transmit data related to the one or more beacons to the database. When an asset is detected as being in dangerous proximity to a piece of equipment, an alert is emitted from the receiving unit.

8 Claims, 4 Drawing Sheets

(56) References Cited

U.S. PATENT DOCUMENTS

| | | | |
|---|---|---|---|
| 2014/0309918 A1* | 10/2014 | Rivet | F16P 3/147 |
| | | | 701/301 |
| 2015/0163652 A1* | 6/2015 | Michaud | H04W 4/22 |
| | | | 370/328 |
| 2015/0170498 A1* | 6/2015 | Beggs | B60Q 1/2673 |
| | | | 340/686.6 |
| 2016/0005300 A1* | 1/2016 | Laufer | H04W 4/02 |
| | | | 340/573.1 |
| 2016/0171854 A1* | 6/2016 | McGowan | A63B 69/0048 |
| | | | 340/541 |

* cited by examiner

HEAVY EQUIPMENT PROXIMITY ALERT SYSTEM

CROSS-REFERENCE TO RELATED APPLICATION

This application claims priority to U.S. Provisional Application Ser. No. 62/113,662 to Mike Mendiola and Steve Rasmussen for a "Heavy Equipment Proximity Alert System" which was filed on Feb. 9, 2015, the contents of which are incorporated herein by reference in its entirety.

FIELD

This disclosure relates to the field of proximity safety systems. More particularly, this disclosure relates to a proximity alert system for tracking one or more persons who enter proximity of heavy equipment.

BACKGROUND

Operating heavy equipment in construction and worksite environments may be hazardous. Heavy equipment may be slow to bring to a stop, and visibility of an operator of the heavy equipment may be limited, thereby increasing the likelihood of an incident occurring involving a person in close proximity to the heavy equipment. Frequently heavy equipment and machinery requires a substantial safety zone around the equipment, and it is difficult for an operator to detect when a person has entered that zone.

While it may be desirable to alert an operator whenever a person is within proximity of a piece of heavy equipment or machinery, the operator may be required to be in proximity to other operators of other pieces of equipment, such when operators of multiple pieces of equipment must operate together to load a truck or otherwise perform work at a site. Alerting an operator operation of a piece of equipment whenever any person enters proximity of the equipment would substantially interrupt operation of the equipment by the operator.

Traditional workplace safety systems require substantial infrastructure to be incorporated at a particular workplace, such as by installing various hardware and detectors for maintaining safety at the particular workplace. However, at some locations it may be difficult, if not impossible, to install substantial infrastructure due to geographic remoteness and lack of resources at a particular workplace. Examples of such locations may include quarries and similar areas where aggregate materials are retrieved or stored. Further, such infrastructure may be extremely expensive to install and maintain.

What is needed, therefore, is system and method for tracking one or more persons who enter proximity of heavy equipment and providing an alert if proximity to those persons creates is determined to be an unsafe condition, such system requiring a minimal amount of infrastructure to track proximity and provide alerts if dangerous proximity is detected.

SUMMARY

The above and other needs are met by a proximity alert system for detecting hazardous conditions within a worksite. In a first aspect, the proximity alert system includes: a database including a processor and a computer readable storage medium, the database configured to store identifying data, an identification code, and a safe proximity related to one or more assets within the worksite; one or more beacons including a transmitter configured to broadcast a low energy transmission at a regular interval, the transmission including a unique identification code, the one or more beacons secured to assets within the worksite; and one or more receiving units attached to one or more pieces of equipment within the worksite comprising a processor, an antenna in communication with the processor, and a communications module in communication with the processor. The receiving units are configured to detect the broadcasted transmissions from the transmitters of the one or more beacons with the antenna, detect the unique identification code of the broadcast transmission of the beacon, and transmit the unique identification code to the database via the communications module. The database analyzes the transmitted unique identification code against identification codes stored on the database to determine an identity and safe proximity of an asset. When the detected distance from the receiving unit to the beacon is less than the safe proximity for the asset identified by the database, the receiving unit emits an alert warning of a dangerous proximity.

In one embodiment, at least one of the one or more receiving units further comprises a transmitter configured to broadcast a low energy transmission at a regular interval, the transmission including a unique identification code, such that the transmission of the at least one receiving unit may be detected by another of the one or more receiving units.

In another embodiment, at least of the one or more beacons is identified as an operator beacon on the database such that when a receiving unit of a piece of equipment operated by an asset wearing the operator beacon is detected as being in close proximity the receiving unit does not emit an alert warning of dangerous proximity.

In yet another embodiment, the one or more receiving units attached to the the one or more pieces of equipment within the worksite further include a GPS module in communication with the processor, wherein the receiving unit transmits a geographic location of the receiving unit to the database via the communications module.

In one embodiment, the database is configured to store a plurality of safe proximities on the database, wherein each of the plurality of safe proximities corresponds to a type of equipment within the worksite.

In another embodiment, the beacon is configured to emit an alert to the asset when the detected distance from the receiving unit to the beacon is less than the safe proximity for the asset identified by the database.

In yet another embodiment, the beacon is configured to emit a Bluetooth LE transmission.

In a second aspect, a method of detecting and alerting of an unsafe proximity of an asset to a piece of equipment within a worksite is provided. The method includes the steps of: providing a database having a processor and a computer readable storage medium, the database in communication with a network; storing identifying data related to an asset within the worksite, the identifying data including an identification code associated with the asset; storing identifying data related to one or more pieces of equipment within the worksite, the identifying data including an identity of the piece of equipment and a safe proximity distance around the piece of equipment; providing one or more beacons including a transmitter and a power source, the one or more beacons secured to assets within the worksite; broadcasting a low energy transmission from the transmitter of the one or more beacons at a regular interval, the transmission including a unique identification code; providing one or more receiving units attached to one or more pieces of equipment within the worksite, the one or more receiving units comprising a processor, an antenna in communication with the processor, and a communications module in communication with the processor; detecting the broadcasted transmissions from the transmitters of the one or more beacons with the receiving units; detecting the unique identification code of the broadcast transmission of the beacon; measuring a strength of the detected transmission to determine a distance to the detected beacon based on the measured strength of the transmission; transmitting the unique identification code to the database via the communications module of the receiving unit; analyzing the transmitted unique identification code against identification codes stored on the database to determine an identity of an asset detected by the receiving unit; and emitting an alert on the receiving unit when an identified asset is determined to be less than safe proximity distance to the piece of equipment in the worksite.

In one embodiment, the method further includes broadcasting a low energy transmission from the one or more of the receiving units at a regular interval, the transmission including a unique identification code.

In another embodiment, the method further includes designating at least one of the one or more beacons as an operator beacon for a particular piece of equipment on the database such that when the operator beacon is detected as being in proximity to the piece of equipment an alert is not emitted on the receiving unit of the piece of equipment.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A proximity alert system 10 is provided for detecting a presence of an asset, such as an individual or other item located within a worksite. When an asset is detected, an identity of the asset is confirmed using a remote database, and if an asset is identified as being in hazardous proximity to a piece of equipment within the worksite an alert is generated warning of the unsafe condition. The proximity alert system 10 allows safety of individuals within a worksite to be monitored without requiring extensive infrastructure to be installed at the worksite, thereby making the system suitable for remote locations and locations where installation of infrastructure may be difficult.

Figure 1:
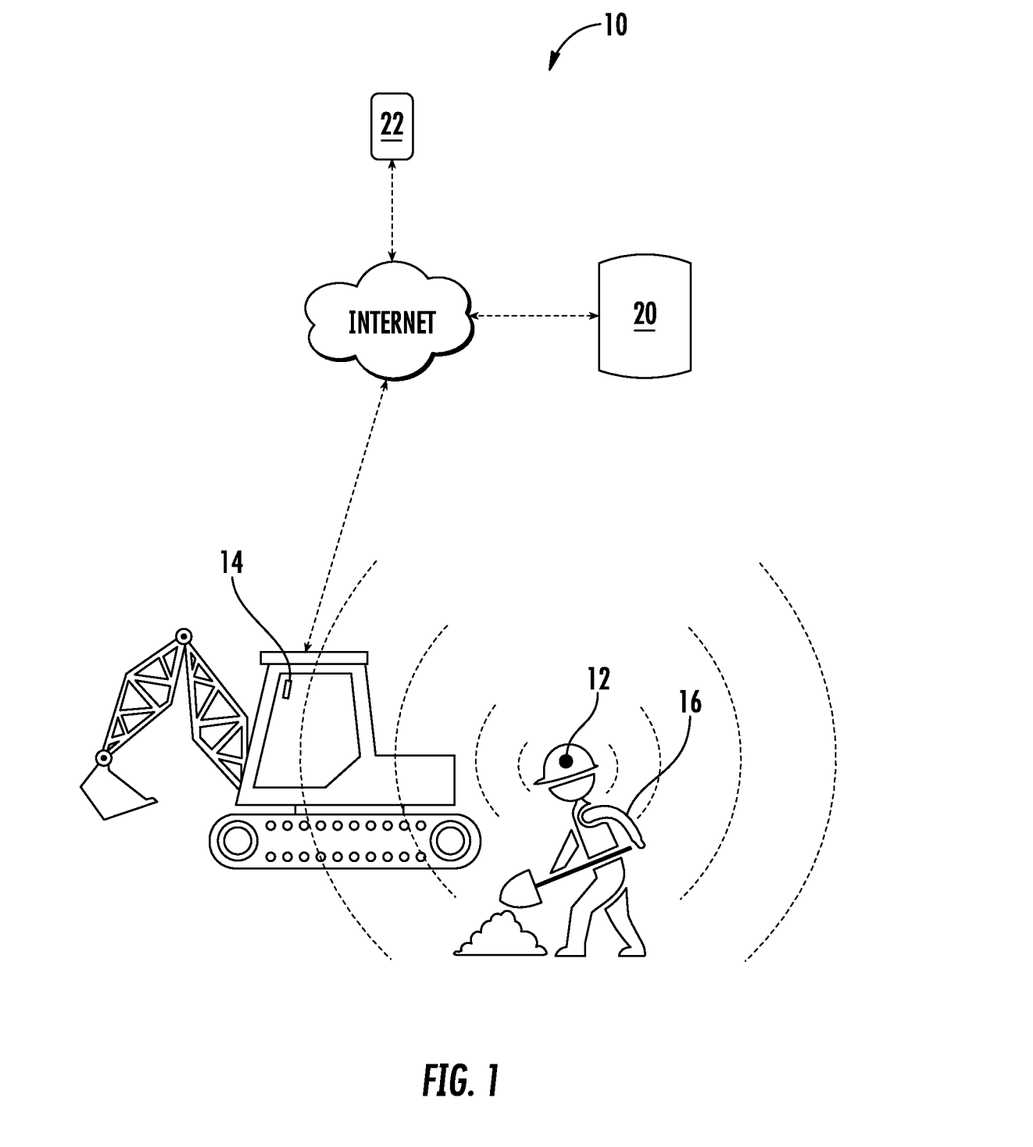
FIG. 1 illustrates a proximity alert system according to one embodiment of the disclosure.

FIG. 1 shows a basic embodiment of the proximity alert system 10 of the present disclosure. The proximity alert system 10 includes one or more beacons 12 and one or more receiving units 14. The one or more beacons 12 are attached to or worn by an asset, such as a worker, 16 and the one or more receiving units 14 are installed adjacent one or more pieces of heavy equipment or machinery 18. The one or more receiving units 14 are in wireless communication with a database 20, and may further be in communication with one or more remote personal devices 22. An alert is generated on the one or more receiving units 14 when the asset 16 is detected and identified as being within an unsafe proximity of the one or more pieces of heavy equipment or machinery 18.

Figure 2:
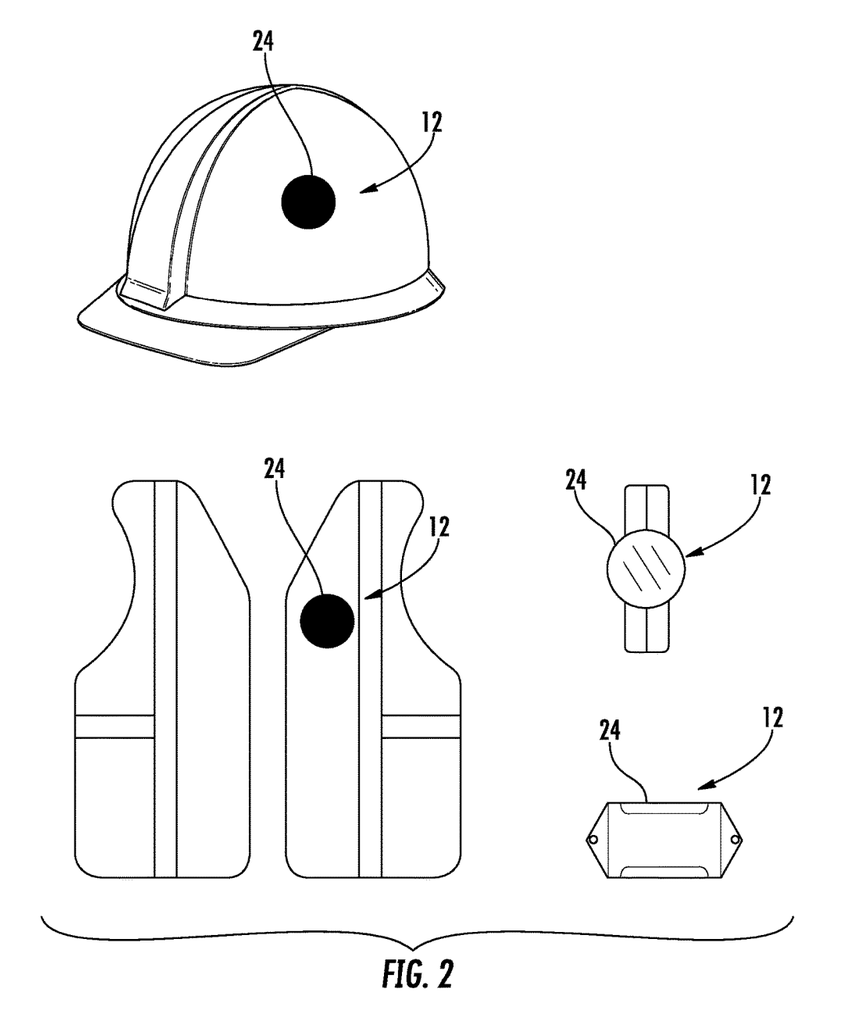
FIG. 2 illustrates one or more beacons of a proximity alert system according to one embodiment of the disclosure.

Referring now to FIG. 2, the one or more beacons 12 are preferably contained within a housing 24. The housing 24 is preferably weather and shock resistant such that the housing 24 is suitable for outdoor use. The beacons 12 include a transmitter such that the one or more beacons 12 emit a low energy transmission including a unique identification code of each beacon 12. The transmitter is preferably one of a Bluetooth™ or Bluetooth Low Energy™ transmitters (commonly referred to as Bluetooth LE™ or Bluetooth Smart™), such that the one or more beacons 12 are readily communicable with one or more observing devices configured to detect transmissions from the one or more beacons 12. The beacon 12 also includes a power source, such as a battery or other portable power source. The beacons may broadcast a low energy transmission at a regular interval, such as an interval of from about every 10 milliseconds to every 5 seconds, wherein an interval may be adjusted based on a desired battery life.

The one or more beacons 12 are preferably attachable to a person, such as by attaching the housing 24 of the beacon 12 to a hardhat, vest, or other wearable garment or accessory. Embodiments of the housing 24 are also attachable to other various items, such as heavy equipment or machinery, or other various items located at a construction or work site.

Figure 3:
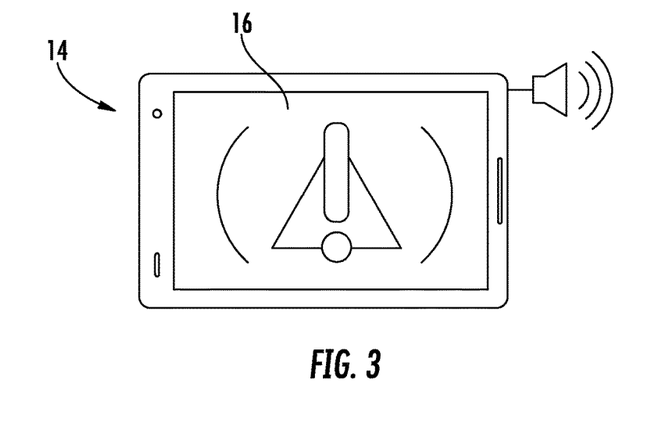
FIGS. 3 and 4 show a receiving unit of a proximity alert system according to one embodiment of the disclosure.
Figure 4:
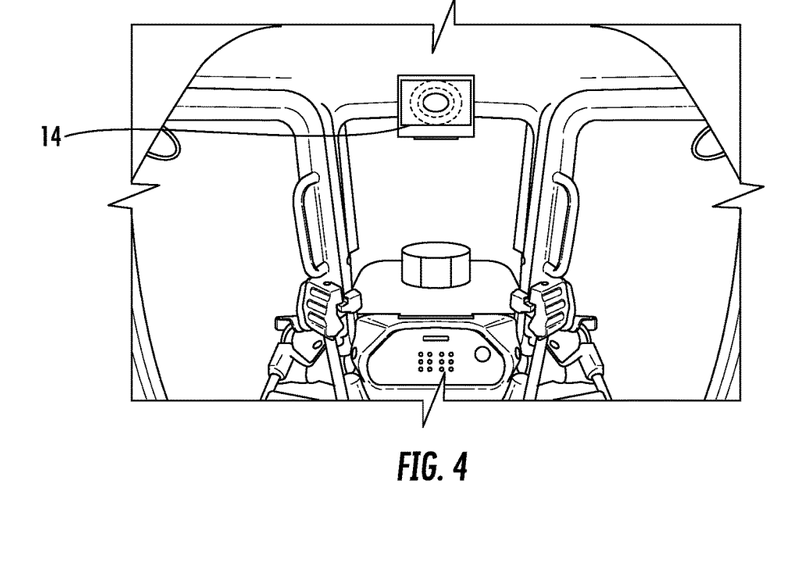

Referring again to FIG. 1, one or more receiving units 14 are provided for detecting proximity of the one or more beacons to the receiving units 14, the one or more receiving units including a processor and computer readable storage medium. The one or more receiving units 14 are configured to detect transmissions emitted by the transmitters of the one or more beacons using an antenna in communication with the processor. As shown in FIG. 4, the one or more receiving units 14 are preferably attached adjacent one or more pieces of heavy equipment or machinery, and preferably adjacent an operator of the heavy equipment or machinery, and include a display 26. In one embodiment, the one or more receiving units 14 are comprised of a tablet, smartphone, or other personal computing device, as illustrated in FIGS. 3 and 4, which are capable of being mounted within a cab of a piece of heavy machinery. Alternatively, the one or more receiving units 14 are contained within a housing secured to a piece of heavy equipment or machinery. The receiving unit 14 further includes a communication module in communication with the processor for wirelessly communicating with the database 20 via the Internet, such as through cellular data, wi-fi, or other wireless communication protocols. The receiving units 14 may further include a GPS module for determining a geographic location of the receiving unit 14.

The one or more receiving units 14 may be central devices while the one or more beacons 12 may be peripheral devices. As referred to herein, a peripheral device passively advertises a signal, and the central devices detect the advertised signals of the peripheral devices. While reference is made to the one or more receiving units 14 acting as central devices, it is also understood that the one or more receiving units 14 may also act as peripheral devices by also including a transmitter for emitting Bluetooth™ or Bluetooth Low Energy™ transmissions.

The one or more receiving units 14 are configured to detect a presence of the one or more beacons 12 within proximity of the one or more receiving units 14 and display an alert on the display 26 of the receiving units 14. Further, the one or more receiving units 14 may emit an audible alert or visual alert when the one or more beacons 12 are within proximity of the one or more receiving units 14. Proximity is determined based on a signal strength of a transmission emitted from the one or more beacons 12 such that if a particular threshold transmission strength is detected from a particular beacon 12 and that beacon 12 is identified as being in dangerous proximity to a piece of equipment, an alert is generated indicating that one of the one or more beacons is within proximity of the one or more receiving units 14 attached to the piece of equipment.

The one or more remote personal devices 22 are in communication with the database 20 and are preferably formed of a tablet, smartphone, personal computer, or other like personal devices, and are in communication with the database 20 using a communication module in electronic communication with a processor.

Figure 5:
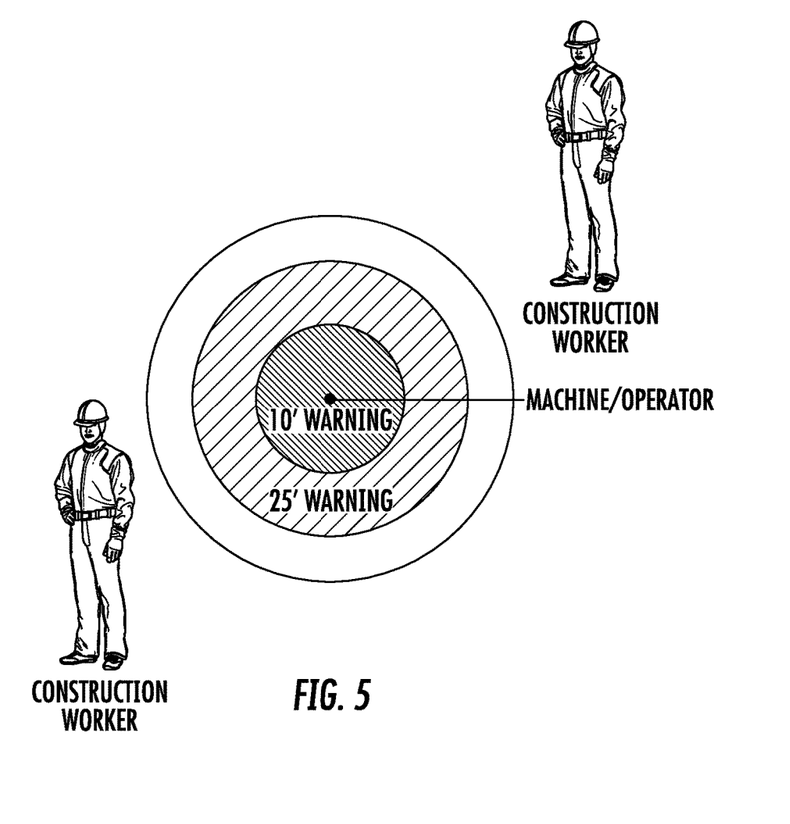
FIG. 5 illustrates a proximity diagram of a proximity alert system according to one embodiment of the disclosure.

Referring again to FIG. 1, the proximity alert system 10 is configured to detect proximity of the one or more beacons 12 to the one or more receiving units 14 that are secured within or adjacent to one or more pieces of heavy equipment of machinery that may cause serious injury to a person near the pieces of heavy equipment or machinery. FIG. 5 illustrates an example of a proximity alert radium diagram of the proximity alert system in which a machine or operator are located at a center of the radius and wherein one or more construction workers are located along an outer portion of the radius. When one of the construction workers is detected within a distance of the machine or operator, and the machine or operator are alerted to the presence of a construction worker in proximity to the machine or operator. In one embodiments, two or more alert levels may be generated based on a distance of the construction worker to the machine or operator.

Additionally the one or more beacons 12 may emit an alert to a worker wearing a beacon 12. For example, an audible tone alert may be emitted by the beacon 12 when proximity is detected to pieces of heavy equipment or machinery. Additionally or alternatively, other alerts may be emitted by the one or more beacons 12 such as visual, tactile, and other like alerts warning of proximity to pieces of heavy equipment or machinery.

In one embodiment, the proximity alert system 10 may associate an operator or user with a unique identification code of the one or more beacons 12 to enable the proximity alert system 12 to determine whether an operator or user are authorized to be in proximity to particular pieces of heavy equipment or machinery or whether an operator or user are not authorized to be in proximity and therefore issue an alert to the one or more receiving units 14.

The database 20 includes a processor and one or more computer readable storage mediums. The database 20 may be located on or adjacent a worksite, or at a location that is distal from the worksite. The database 20 may be configured in a single location or may comprise multiple pieces of hardware equipment located at different locations that are in communication via a network.

Unique identification codes of the one or more beacons 12 may be stored on the one or more computer readable mediums of the database 20 and associated with a particular asset or operator or with a particular piece of equipment or machinery. For example, when one of the beacons 12 is attached to a particular piece of equipment, such as a truck or loader, an identification code associated with that beacon is stored on the database 20 as corresponding to that particular truck or loader. Identifying information of the asset to which the beacon 12 is attached is stored on the database 20 including a name of the asset, type of asset, and safe proximity distance surrounding the asset. Similarly, when a beacon 12 is attached to a particular user's clothing or otherwise worn by a user or operator, a unique identification code of that beacon 12 is associated with that user or operator in the database 20.

In addition to storing unique identification codes of the beacons 12 on the database 20, parameters may be assigned to and associated with each particular beacon 12 in the proximity alert system 10. Assignable parameters include, for example, name of person or equipment to which the beacon 12 is secured, proximity distances at which an alert should be generated, type of object to which the beacon 12 is fixed, and other various parameters associated with particular uses of the beacons 12. Proximity distances may vary depending on the object to which the beacon 12 is attached. For example, one beacon may be attached to a piece of equipment that requires a large area around it to remain clear during operation, thereby being assigned a greater proximity distance that would create an alert if that particular beacon 12 is located nearby. The parameters that are assignable may be altered by a user via one or more of the receiving units 14 or the one or more remote personal devices 22 depending on a desired use of each beacon 12.

Identifying information related to each of the one or more receiving units 14 may be stored on the computer readable medium of the database 20, including a name of a piece of equipment adjacent the receiving unit 14. Additionally, a safe proximity to the piece of equipment of the particular receiving unit 14 may be stored on the database. In one embodiment, multiple safe proximities may be stored on the database, such as a stationary safe proximity and a dynamic safe proximity wherein the dynamic safe proximity may be greater than the stationary safe proximity when the piece of equipment is in motion. For mobile equipment such as trucks and loaders, proximity distance assigned to a particular beacon may vary based on whether the equipment is in motion or static, and further vary based on a particular speed of the equipment wherein a greater speed would necessitate a greater proximity distance for creating an alert. A piece of equipment and attached receiving unit 14 may be determined as being in motion based on data received from a GPS module of the receiving unit, wherein the GPS data would indicate movement of the piece of equipment.

In some situations, it may be desirable that an alert not be generated on the one or more receiving units 14 when a beacon is detected in proximity to a particular receiving unit 14. For example, when a user is operating a particular piece of machinery or equipment, it would not be desirable for a receiving unit 14 within the particular piece of machinery or equipment to alert that the operator is in proximity to the piece of machinery or equipment. Similarly, some projects may require that one or more pieces of equipment or machinery, operators, and other persons be working in proximity with one another on a project or task, and it may not be desirable to initiate an alert every time that the one or more pieces of equipment or machinery, operators, and other persons are in proximity to one another.

The proximity alert system 10 is configured to determine whether one or more beacons 12 and their associated objects are intended to be in proximity a particular receiving unit 14, and if so, to ignore the presence of those beacons 12 within proximity of that particular receiving unit 14. In one embodiment, an identification of a beacon stored on the database may be designated as an operator such that if a proximity of the beacon identified as an operator is detected adjacent a piece of equipment within a worksite, an alert may not be generated because the database determines that the operator is supposed to be in proximity to the equipment to operate the equipment. In one particular embodiment, the operator may designate that a beacon is associated with the operator on a receiving unit of a piece of equipment within the worksite using a display and user interface on the receiving unit of the piece of equipment, wherein the receiving unit transmits data to the database designating the operator as being allowed in close proximity to the piece of equipment.

The one or more remote personal devices 22 include a user interface that displays a status of the one or more receiving units 14 and whether proximity of one or more of the beacons 12 to the one or more receiving units has been detected. Further, a user may create and monitor proximity alerts and beacon parameters stored on the database 20 via the remote personal device 22.

In operation, the system 10 determines whether an asset including an attached beacon 12 is in dangerous proximity to a piece of equipment including an attached receiving unit 14. An identity of the asset is stored on the database 20 and associated with a particular beacon 12 and a unique identification code transmitted by the beacon. Similarly, an identity and safe proximity of a piece of equipment is stored on the database 20 and associated with a particular receiving unit 14 mounted to or adjacent a piece of equipment. The beacon 12 attached to the asset broadcasts a low energy transmission that includes the unique identification code of the asset and beacon 12. One of the receiving units 14 detects the broadcast transmission from one of the beacons 12 and detects a unique identification code of the beacon 12. The receiving unit 14 determines a distance to the detected beacon 12 based on a measured strength of the received transmission from the beacon 12 and may transmit the measured distance to the database 20. A distance to the detected beacon 12 may be determine by other known means, such as the Time of Flight (ToF) or Time of Arrival (ToA) of a signal from the beacon 12 to the receiving unit 14. One or more algorithms may be employed on the receiving unit 14 such that a distance to the beacon 12 may be determined based on a signal received from the beacon 12.

The detected identification code is also transmitted from the receiving unit 14 to the database 20. The database analyzes the identification code against identification codes stored on the database 20 to determine an identity of the beacon's asset and a safe proximity distance between the asset and piece of equipment. The database 20 determines whether the asset is within an unsafe proximity of the piece of equipment based on the distance between the beacon 12 and receiving unit 14, safe proximity distances for the particular asset and piece of equipment, and any other known information including whether the piece of equipment is moving or stationary and whether an identity of the asset indicates that the asset is an operator of the particular piece of equipment. If the database 20 determines that the distance between the asset and piece of equipment is less than a safe proximity distance, an alert is transmitted from the database 20 to the receiving unit 14 such that the receiving unit 14 emits an audible or visual alert to warn an operator of the piece of equipment of a dangerous proximity condition.

In one embodiment, the receiving unit 14 also emits a transmission including a unique identification code of the receiving unit 14. When a receiving unit 14 detects a transmission from another receiving unit 14, the database may determine whether the two receiving units are in dangerous proximity to each other and issue an alert, such as if two pieces of equipment are in dangerous proximity to one another and pose a risk of a collision. If a dangerous proximity is detected, an alert may be emitted on the receiving units of both pieces of equipment to warn their respective operators of an unsafe condition.

When proximity of a user to one or more pieces of heavy equipment or machinery is detected and an alert created, data related to the alert is stored on the database 20. For example, if proximity is detected and an alert emitted, data related to an identity of a worker and piece of equipment, which is associated with one or more particular beacons 12 and receiving units 14, is stored on the database 20. Other data associated with a particular proximity event is stored on the database 20, such as a geographic location of the receiving unit 14 and beacon 12. Data related to a detected proximity event may be transmitted to the one or more receiving units 14 and the one or more remote personal devices 22. In one embodiment data related to a proximity event is transmitted directly to the database 20 when the proximity event occurs via the communication module of the one or more receiving units 14. Alternatively, data related to a proximity event may be stored on the one or more receiving units 14 and later transmitted to the database 20, such as on a regular periodic basis or when the one or more receiving units are not in immediate communication with the database 20.

The proximity alert system 10 of the present disclosure provides a system for monitoring equipment and detecting when a worker has entered a hazardous zone in proximity to the equipment. The proximity alert system 10 advantageously enables detection of a worker in dangerous proximity to equipment without requiring substantial infrastructure such as various sensors and other hardware typically required. Instead, the one or more receiving units 14 detect proximity of the one or more beacons 12 and create an alert whenever proximity is detected. Further, the one or more receiving units 14 are in communication with the database 20 which may be at a location that is remote from a particular worksite such that the database is not required to be installed at the worksite. Further, the proximity alert system 10 determines whether an alert should be triggered for a particular beacon 12 based on parameters of the beacon 12 such as whether the beacon 12 is intended to be in proximity to a particular piece of equipment.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A proximity alert system for detecting hazardous conditions within a worksite comprising:
- a database including identifying data, a plurality of identification codes, and a safe proximity related to one or more assets within the worksite;
- one or more beacons including a transmitter configured to broadcast a low energy transmission at a regular interval, the transmission including a unique identification code of the one or more beacons, the one or more beacons secured to assets within the worksite;
- one or more receiving units attached to one or more pieces of equipment within the worksite comprising a processor, an antenna in communication with the processor, a communications module in communication with the processor, and a transmitter configured to broadcast a low energy transmission at a regular interval, the transmission including a unique identification code of the one or more receiving units, the one or more receiving units configured to:
  - detect the broadcasted transmission from the transmitter of the one or more beacons with the antenna;
  - detect the unique identification code of the broadcast transmission of the one or more beacons;
  - measure a strength of the detected transmission to determine a distance to the detected beacon; and
  - transmit the unique identification code of the one or more beacons to the database via the communications module;
- wherein the transmitted unique identification code of the one or more beacons is analyzed by a database processor against the plurality of identification codes stored on the database to determine an identity and safe proximity of an asset;
- wherein when the detected distance from the receiving unit to the beacon is less than the safe proximity for the asset identified by the database, the receiving unit emits an alert warning of a dangerous proximity, and
- wherein the transmission of the at least one receiving unit including the unique identification code of the one or more receiving units is detected by another of the one or more receiving units.

2. The proximity alert system of claim 1, wherein at least one of the one or more beacons is identified as an operator beacon on the database such that when a receiving unit of a piece of equipment operated by an asset wearing the operator beacon is detected as being in close proximity the receiving unit does not emit an alert warning of dangerous proximity.

3. The proximity alert system of claim 1, wherein the one or more receiving units attached to the one or more pieces of equipment within the worksite further includes a GPS module in communication with the processor, wherein the receiving unit transmits a geographic location of the receiving unit to the database via the communications module.

4. The proximity alert system of claim 1, wherein a plurality of safe proximities are stored on the database, wherein each of the plurality of safe proximities corresponds to a type of equipment within the worksite.

5. The proximity alert system of claim 1, wherein the beacon is configured to emit an alert to the asset when the detected distance from the receiving unit to the beacon is less than the safe proximity for the asset identified by the database.

6. The proximity alert system of claim 1, wherein the beacon is configured to emit a Bluetooth LE transmission.

7. A method of detecting and alerting of an unsafe proximity of an asset to a piece of equipment within a worksite, the method comprising:
- providing a processor, a computer readable storage medium, and a database, the database in communication with a network;
- storing identifying data related to an asset within the worksite on the database, the identifying data including an identification code associated with the asset;
- storing identifying data related to one or more pieces of equipment within the worksite on the database, the identifying data including an identifying of the piece of equipment and a safe proximity distance around the piece of equipment;
- providing one or more beacons including a transmitter and a power source, the one or more beacons secured to assets within the worksite;
- broadcasting a low energy transmission from the transmitter of the one or more beacons at a regular interval, the transmission including a unique identification code of the one or more beacons;
- providing one or more receiving units attached to one or more pieces of equipment within the worksite, the one or more receiving units comprising a processor, an antenna in communication with the processor, and a communications module in communication with the processor;
- broadcasting a low energy transmission from the one or more of the receiving units at a regular interval, the transmission including a unique identification code of the one or more receiving units detected by another of the one or more receiving units;
- detecting the broadcasted transmissions from the transmitter of the one or more beacons with the receiving units;
- detecting the unique identification code of the broadcast transmission of the one or more beacons;
- measuring a strength of the detected transmission to determine a distance to the detected beacon based on the measured strength of the transmission;
- transmitting the unique identification code of the one or more beacons to the database via the communications module of the receiving unit;
- analyzing the transmitted unique identification code of the one or more beacons against identification codes stored on the database with the processor to determine an identity of an asset detected by the receiving unit;
- emitting an alert on the receiving unit when an identified asset is determined to be less than a safe proximity distance to the piece of equipment in the worksite.

8. The method of claim 7 further comprising designating at least one of the one or more beacons as an operator beacon for a particular piece of equipment on the database such that when the operator beacon is detected as being in proximity to the piece of equipment an alert is not emitted on the receiving unit of the piece of equipment.

* * * * *